May 26, 1953     A. L. BUTTINO ET AL     2,639,555
CATHODE-RAY TUBE SEALING PROCESS
Filed Oct. 15, 1949     2 Sheets-Sheet 1
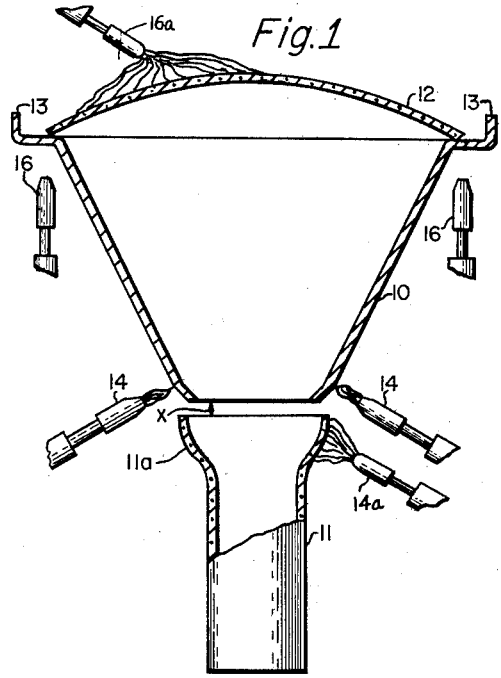
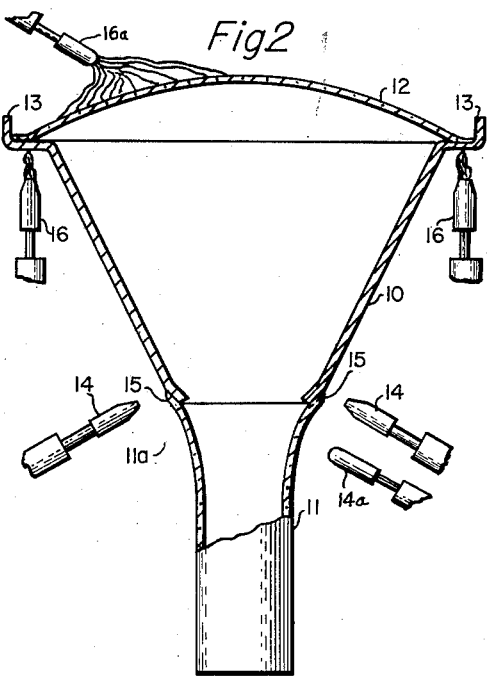
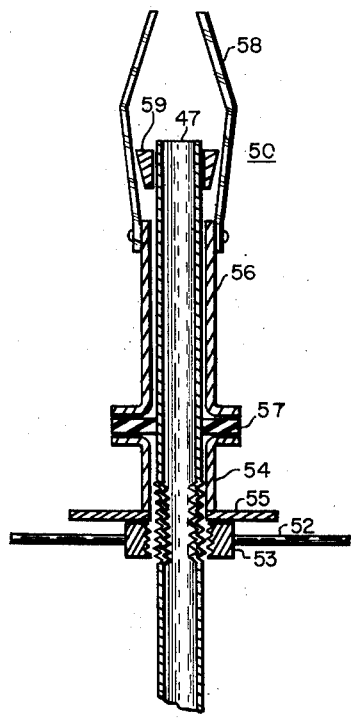
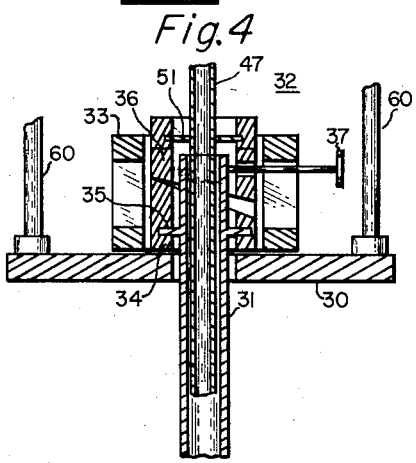
ALBERT L. BUTTINO
HOWARD R. PATTERSON
*INVENTORS*
BY Francis W. Crotty
THEIR ATTORNEY Patented May 26, 1953

2,639,555

UNITED STATES PATENT OFFICE 2,639,555

CATHODE-RAY TUBE SEALING PROCESS

Albert L. Buttino, San Francisco, Calif., and Howard R. Patterson, Belmont, Mass., assignors to The Rauland Corporation, a corporation of Illinois Application October 15, 1949, Serial No. 121,564

6 Claims. (Cl. 49—81)

This invention relates to the fabrication of cathode-ray tubes of the type having an envelope comprising a neck portion of vitreous material such as glass or the like, a metallic conical portion, and a transparent window or viewing plate of glass or similar transparent plastic. More particularly, this invention is directed to methods for the formation of glass-to-metal seals in the fabrication of envelopes for such tubes.

In cathode-ray tubes of the afore-described type, the metallic conical portion of the envelope is usually provided with a flange or lip about its larger rim in which the glass window is fitted for sealing to the cone. To obtain a satisfactory seal it is preferable that the conical portion be held with its axis in a vertical position and the window be placed on the cone in contact with the flange. Gas flames may then be directed to the flange of the metal cone while the cone is rotated about its axis for uniformity of heating. The glass of the window at the point of contact with the flange softens and settles in the flange sealing the window to the cone.

Heretofore in the art, it was considered necessary that the cone be placed in a lathe or other suitable apparatus with its axis in a horizontal position or in a vertical position with the large end of the cone downward and the neck above the cone, during the sealing of this vitreous neck portion to the metal cone. The vitreous neck may then be brought into juxtaposition with the small end of the cone, overlapping it slightly. Gas flames may then be directed on the overlapping area, and the cone and neck rotated in unison for uniform heating. The portion of the glass overlapping the cone softens and adheres to the metal cone completing a seal between the neck and cone.

Heretofore, it has commonly been considered infeasible to seal the vitreous neck portion of a cathode-ray tube to a metal cone portion with the axis of these portions in vertical alignment with the cone above the neck. This was a logical conclusion since in the prior art sealing processes, the rim of the neck portion was heated to a molten state, and if this were done in such a vertical array the molten glass would run due to gravity and render sealing impractical. Because of this conclusion, the sealing processes heretofore adhered to have been extremely cumbersome and costly.

In accordance with the afore-described prior processes, it is necessary to undergo two separate and distinct operations in two separate machines to fabricate the envelope of the cathode-ray tube. The cone is initially placed in a first machine with its axis in a vertical position to seal the glass window to its large end. The assembly is then removed, annealed, and allowed to cool. The assembly is then placed in a second machine with its axis in a horizontal position, or in a vertical position with the large end of the cone downward, and the glass neck is sealed to the small end of the cone, as already set forth. Once this operation is completed, the envelope is again placed in an annealing oven. Care must be taken during the second operation that the previously sealed window is not destroyed during the neck-sealing operation. In addition, the envelope must be brought gradually to the sealing temperature in each of the operations to avoid cracking of the glass. Such processes, employing a plurality of separate machine operations and a time-consuming heating interval incident to each operation, are obviously cumbersome and costly.

The present invention is predicated on the premise that it is both possible and expedient to seal the neck portion of the envelope to the metal conical portion when the axis of the cone is held in a vertical position over the neck. In accordance with this invention, the metallic cone, composed for example of chrome steel, is placed with its axis vertical and the vitreous neck is positioned coaxially with but below the cone with its rim spaced from the small end of the cone. Both components are preferably rotated in unison for uniform heating. Gas burners, or other suitable heating elements, are utilized to locally heat the small end of the cone with the result that the adjacent portion of the neck is heated by radiation or "splash" heat from this small end until the adjacent portion reaches a plastic state but not a molten state so that the glass does not "run."

After the adjacent portion of the neck has reached a plastic state and chrome oxide has been formed on the small end of the metal cone due to the heating process, the neck is then slowly moved vertically against the heated rim of the cone. Upon contact with this heated rim, the upper rim of the glass neck touching the rim of the cone becomes more plastic and due to the affinity of the glass to the oxide this surface creeps slightly, against gravity, up this rim. When the glass neck contacts the heated rim and is properly sealed, the heating elements are turned off and the glass settles about this rim sealing the neck to the cone.

The invention provides that the neck be sealed to the metallic cone with these components positioned vertically with the larger end of the cone upward. This enables the glass window also to be sealed to the metal cone without the need for further positioning of the cone. Therefore, in accordance with a preferred method of practicing the invention, the glass window is placed in the flange around the larger end of the cone before the neck-sealing operation is carried out. During the afore-described neck-sealing operation, the heating elements heat the cone and heat is conducted and radiated to the glass window placed at the large end. In this manner the glass window is slowly heated to a temperature high enough so that the heated elements may now be applied to the flange for sealing the glass window without fear of cracking it.

The process of this invention enables the envelope of the cathode-ray tube to be fabricated in a single machine instead of requiring two separate machines as in prior processes. The present process further obviates the need for annealing the envelope and allowing it to cool between each operation, and also the need for gradually bringing the envelope up to high temperatures for each of a series of operations.

It is, accordingly, an object of this invention to provide an improved manufacturing process for glass-to-metal sealing in the fabrication of cathode-ray tube envelopes, which is highly efficient and which avoids one or more of the aforementioned limitations of prior processes.

A further object of this invention is to provide an improved method for the fabrication of cathode-ray tube envelopes which enables these envelopes to be constructed in a single machine and in a simplified manner.

Yet another object of this invention is to provide an improved process for glass-to-metal sealing in the fabrication of cathode-ray tube envelops by means of which such envelopes may be produced more quickly and more economically than in prior processes.

The features of this invention which are believed to be new are set forth with particularity in the appended claims. The invention itself, however, together with further objects and advantages thereof may best be understood by reference to the following description when taken in conjunction with the accompanying drawings, in which:

Figures 1 and 2 show diagrams illustrating a cathode-ray tube envelope in a position for sealing in accordance with the invention.

Figures 4 and 5 show various components of the apparatus in Figure 3 in greater detail.

Figure 3:
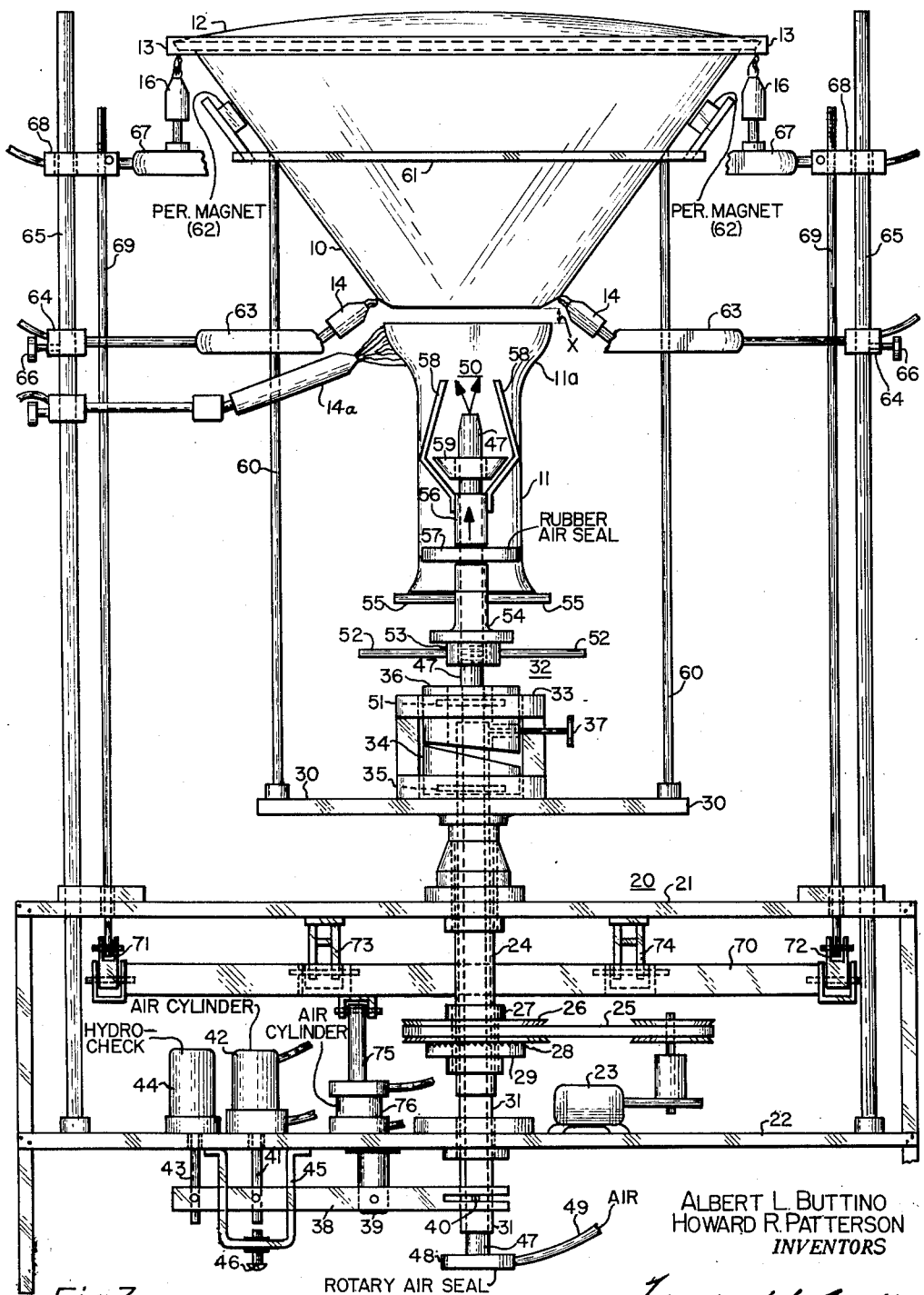
Figure 3 shows one form of apparatus suitable for carrying out the invention.

Reference is now made to Figures 1 and 2 in which the envelope of a cathode-ray tube is shown to comprise a metallic conical portion 10, a vitreous portion 11 having a flared or enlarged end section 11a, and a glass window 12 usually in the form of a convex circular section. It is to be understood, of course, that the window and other components of the envelope may have a circular, rectangular or other sectional shape, and the term "tubular" used in the claims appended hereto is intended to refer generically to these various shapes. The conical portion 10 is placed with its axis in a vertical position and, as shown in Figure 1, the neck 11 is placed along this axis with the end of its flared section 11a spaced a distance $x$ from the rim of the smaller end of the cone. The window 12 is placed in a flange portion 13 formed in the larger, upper end of the cone.

Figure 1 illustrates the first step in the sealing procedure and in this step a circular array of gas burners 14, or other suitable heater elements, are directed onto the metallic cone at a position near its small end, as shown. As previously stated, the cone 10 and neck 11 are rotated in unison about their common axis for uniform heating. The portion of the flare section 11a adjacent the lower rim of cone 10 receives heat by radiation from the cone and is heated in this fashion until the glass reaches a plastic state. It has been found desirable to play a soft gas flame such as from a burner 14a onto the glass flare 11a during this operation to insure uniform heating of the flare, thus avoiding any possibility of cracking the vitreous neck 11. The neck 11 is then moved vertically upward until its end, which is now in a plastic state, surrounds the heated lower rim of the cone 10 in contact therewith. As previously discussed, due to the affinity of the glass for the oxide formed on the surface of this rim by the heating process, the glass surface contacting the rim creeps upwardly along the outer periphery of the cone against the force of gravity. The heat is removed before the outside surface of the flared end of neck 11 loses its plasticity and becomes molten, and the glass settles about the heated rim forming a seal between the neck and the cone, this seal being shown as 15 in Figure 2.

Figure 2 shows a further step in the glass to metal process of a preferred embodiment of the present invention. The window 12 which is in contact with the flange 13 is heated by radiation and conduction from the heated cone 10. It has also been found preferable to play a soft, bushy flame such as from a burner 16a over the top of the window during the entire process to insure uniform heating thereof, thus preventing any possibility of cracking. Another circular array of gas burners 16, or other suitable heating elements, may be directed at the flange 13, as shown, so that the rim of the window 12 softens and settles into sealing contact with substantially the entire area of the flange, as shown. It is usually desirable to introduce air pressure into the interior of the envelope during this latter operation to prevent sagging of the edge of the portion of the window adjacent the heated flange during the sealing process.

When the window 12 is sealed to the cone 10, the completed assembly is now placed in an annealing oven to equalize the stresses in the metal and glass thereof and remove the strain from the glass window. Upon removal from the oven the assembly is allowed to cool to room temperature.

One form of apparatus suitable for carrying out the invention is shown in Figure 3. This apparatus is disclosed and claimed in copending application Serial No. 127,457, filed November 15, 1949, in the name of Arthur Harder, entitled "Cathode-Ray Tube Sealing Apparatus" and assigned to the present assignee. The apparatus includes a table 20 having a top 21 and a shelf 22. An electrical motor 23 is mounted on the shelf 22 to rotate a drive tube 24 by means of a belt drive 25. The belt drive 25 is coupled to a drive wheel 26 rotatably mounted on tube 24, and motion is translated from the wheel 26 to the drive tube 24 through a clutch arrangement. This clutch arrangement comprises a collar 27 fixed to the tube 24, a pressure spring 28, and a pressure plate 29 holding the spring against the wheel 26 with a predetermined pressure. This provides a friction drive from the wheel 26 to the pressure plate 29 and, hence, to the drive tube 24. The drive tube 24 has a spindle 30 mounted thereon so that rotation of this tube by the motor 23 causes the spindle to rotate.

A lift tube 31 is mounted concentrically within the drive tube 24, and extends beyond the spindle 30 into a cylindrical cam arrangement 32. The cam arrangement 32 comprises a cylindrical housing 33, a first cylindrical cam 34 fixed to the lift tube 31 by means of a shoulder 35, and a second cylindrical cam 36. The cam 36 is rotatable to give it a variable displacement from the cam 34, for reasons to be described, and the cam 36 may be locked at any desired displacement therefrom by means of a locking rod 37 threaded through cam 36 against the surface of the lift tube 31.

A lift arm 38 is mounted under the shelf 22 on a pivot 39. One extremity of the lift arm 38 is coupled to a pin 40 carried by the lift tube 31. The other end of the lift arm 38 is coupled to the plunger 41 of an air cylinder 42, and to the plunger 43 of a hydro-check 44, as shown. The hydro-check 44 has the function of retarding the speed of travel of the plunger 41 of air cylinder 42, and operates in well-known manner to provide constant speed to its plunger 43 regardless of the pressure exerted on this plunger by plunger 41 through the arm 38. The downward travel of the plunger 41 and, thus, the upward motion of the lift tube 31, is limited by a bracket 45 and adjusting screw 46.

An air tube 47 is mounted concentrically within the lift tube 31. A rotary air seal 48 of well-known construction is mounted on the lower extremity of the air tube, and air is introduced into the air tube from a source, not shown, through a rubber tube 49. The air tube 47 extends beyond the cam 32 and through a neck chuck 50 which supports the neck 11 of the cathode-ray tube envelope. The air tube 47 is fixed to the cylindrical cam 36 by means of a shoulder 51, so that adjustment of the position of cam 36 relative to cam 34 varies the relative vertical position of the air tube 47 within the lift tube 31.

The neck chuck 50 includes tightening bars 52 extending radially from a collar 53 threaded to the air tube 47. A sleeve 54 is mounted concentrically with the air tube 47 and rests on the collar 53, this sleeve having a pair of radially-extending rods 55 for supporting the neck 11. A further sleeve 56 is mounted concentrically with the air tube 47 and is separated from the sleeve 54 by means of a rubber air seal 57. A plurality of resilient fingers 58 are mounted on the sleeve 56, and a conical shaped wedge 59 is threaded to the air tube 47 in a position to urge the fingers 58 against the inside surface of the neck 11. Rotation of the bars 52 forces the sleeves 54 and 56 upwardly and thus, drives the fingers 58 against the wedge 59 so that they firmly hold the neck 11 in position on the neck chuck 50. When the wedge 59 contacts the end of the sleeve 56 so that further upward travel of the sleeve is arrested, subsequent rotation of the bars 52 causes the sleeve 54 to compress the rubber air seal 57 bulging the rubber against the inside surface of the neck 11 to form an effective air seal.

A pair of spindle rods 60 are mounted on the spindle 30 and extend upwardly to support a circular bracket 61 at their uppermost extremities. The bracket 61, in turn, serves as a support for the metal cone 10 of the cathode-ray tube envelope, and a plurality of permanent magnets 62 are disposed about this bracket to hold the cone firmly in place.

A plurality of burners 14 are mounted on a ring 63 surrounding the assembly 10—11 and this ring is supported by collars 64 adjustably mounted on vertically extending guide rods 65. The position of the rings 63 and, hence, of the burners 14 may be adjusted by loosening set screws 66 and moving collars 64 along the guide rods 65. A further plurality of burners 16 are mounted on a ring 67 surrounding the upper portion of the cone 10 and directed upwards to the flange 13. Burners 14a and 16a may similarly be mounted on rods 65, as shown. The ring 67 is guided by the guide rods 65 by means of collars 68 slidably mounted thereon, these collars being fixed to a pair of lift rods 69. The lift rods 69 extend through the top 21 of table 20 and are coupled to a lift frame 70 through linkage arrangements 71 and 72. The frame 70 is pivoted to the table top 21 by pivots 73 and 74, and is coupled to the plunger 75 of an air cylinder 76. When air is introduced into the air cylinder 76, the frame 70 and, hence, burners 16 are moved upwards to the position shown in the drawing. On the other hand, when the air in the cylinder 76 is released, the burners 16 move downward from their illustrated position to enable an operator to remove the cathode-ray tube envelope from the machine.

A sectional view of the cylindrical cam arrangement 32 is shown in Figure 4, and it can be seen from this figure that when the rod 37 is loosened, the relative displacement of the cams 34 and 36 may be adjusted. Since the air tube 47 is fixed to the cam 36 and the lift tube 31 is fixed to the cam 34, the relative displacement of the cams 34 and 36 determines the longitudinal position of the air tube 47 within the lift tube 31. Since the neck chuck 50 supporting the neck 11 is mounted on the air tube 47, variation of the longitudinal position of this tube adjusts the distance of the rim of the flared section 11a from the lower rim of the cone 10.

A sectional view of the neck chuck 50 is illustrated in Figure 5 to show clearly the operation of the chuck and how rotation of the threaded collar 53 forces the fingers 58 against the wedge 59, and thus outwardly against the inside surface of the neck 11, until the wedge meets the upper end of sleeve 56, whereby further rotation of the collar 53 causes the rubber air seal 57 to bulge outwards.

The operation of the apparatus of Figure 3 is as follows: The gas burners 14, 16 are turned off or to a low pilot level. The air in cylinder 76 is released so that the burners 16 are in their lowermost position. The vitreous neck 11 is placed on the neck chuck 50 and the rods 52 are rotated so that the neck is firmly held in place and the air seal 57 is bulged against the inside surface thereof to effect an air seal. The metal cone 10 is placed in the brackets 61 and tapped into place so that its axis is in a vertical position, the cone being firmly held in this position by the permanent magnets 62. The rod 37 is loosened and the cam 36 is rotated until the air tube has a longitudinal position within the lift tube 31 to provide a desired distance $x$ between the end of neck 11 and the lower rim of the cone 10. The distance $x$ may be established by a feeler gage or other suitable tool inserted between the neck and the cone. Once the distance $x$ is set up the rod 37 is tightened. The neck 11 and cone 10 are rotated in unison by means of the motor 23, a soft flame from burner 14a is played over the flared portion 11a of neck 11 and, when this portion is sufficiently heated, the gas burners 14 are ignited and directed onto the lower portion of the cone 10. At the same time a soft, bushy flame from burner 16a may be played over the top surface of window 12 to insure uniform heating of the window. After a certain time interval, air is introduced into the air cylinder 42 causing the lift arm 38 to move slowly against the action of the hydro-check 44 and the lift tube 31 to rise thereby moving the neck 11 into contact with the cone 10. The downward travel of plunger 41 of the air cylinder 42, and thus the upward travel of the neck 11, is arrested by the screw 46 which is adjusted to establish a desired amount of contact between the flared section 11a of neck 11 and the lower rim of cone 10.

The burners 14 are turned off at the proper time to produce the desired seal between the neck and the cone. Air is now introduced into the air cylinder 76 to raise the burner ring 67 into its uppermost position shown in the drawing, and the burners 16 are ignited to heat locally the flange 13. The motor 23 continues to rotate the cone 10 to provide uniform heating of the flange 13. Air is introduced through the rubber tube 49 and rotary air seal 48 into the air tube 47 and, hence, into the interior of the cone to prevent the edge of window 12 from sagging during the window sealing operation. It is usual practice to provide a small aperture in the air seal 57 to allow some of this air to escape and avoid excessive pressure in the interior of the cone.

After a certain interval, the burners 16 are turned off and the edge of window 12 settles into the flange 13, sealing the window to the cone 10. The air in cylinder 76 is now released and the burner ring 67 drops to its lowermost position. This enables an operator to insert tongs around the flange 13 to remove the assembled envelope. The envelope is then placed in an annealing oven for a certain interval, removed and allowed to cool.

This invention provides, therefore, an improved method for fabricating envelopes of cathode-ray tubes in which the conical portion of the envelope is held with its axis in a vertical position and the neck and window portion sealed thereto while the cone is in this position, thus enabling the process to be carried out in a single machine and with a minimum of space and operations.

In carrying out the invention the following values were used with highly satisfactory results, and they are now given by way of example, and without any intention of being limited thereto: The metal cone 10 is composed of a stainless steel alloy, Sealmet, containing 27% to 29% chromium and is positioned with its axis extending vertically and its larger end up. The neck 11 is placed below the cone coaxially therewith with the rim of its flared portion approximately $\frac{5}{16}$" from the lower lip of the cone. The window 12 is placed in the flange 13 of the cone. The lower lip of the cone is locally heated by oxy-gas burners 14 directed thereon approximately $\frac{1}{4}$" upwards from the edge. The cone is brought to a temperature of approximately 1150° C. by these burners.

A soft flame playing on the window 12 brings it up to a temperature between 300 and 350° C., which is below the annealing temperature of the glass. The flange 13 is heated by pre-mix oxy-gas burners 16 to a temperature of approximately 1100° C. The rate of settling of the edge of the window 12 in the flange 13 is controlled by air pressure from the air tube 47 at approximately four ounces/sq. in. to prevent the edge of the window from sagging and flowing around the flange into the cone.

After the seal is completed, the envelope is placed in an annealing oven at approximately 600° for five minutes to equalize the metal and glass temperatures and remove the strain from the window 12. The envelope is then removed and allowed to cool to room temperature.

While a certain embodiment of the inventive process has been shown and described, modifications may be made, and it is intended in the appended claims to cover all such modifications as fall within the true spirit and scope of the invention.

We claim:

1. The method of uniting a tubular vitreous neck member and a glass plate to a tubular metallic member having an outwardly flaring flange at one end, comprising: mounting said metallic member with its axis in a vertical position and with said flanged end upward; placing said glass plate on said flanged end; mounting said neck member coaxial with said metallic member but spaced from the lower end of said metallic member; locally heating said lower end of said metallic member and the portion of said neck member adjacent said lower end until said portion reaches a plastic state; bringing said neck member and said metallic member into contact with each other; and locally heating the edge of said glass plate to sealing temperature.

2. The method of uniting a tubular vitreous neck member and a glass plate to a tubular metallic member having an outwardly flaring flange at one end comprising: rotatably mounting said metallic member with its axis in a vertical position and said flanged end upward; placing said glass plate on said flanged end; mounting said neck member coaxial with said metallic member but spaced from the lower end thereof for rotation in unison therewith; locally heating the lower end of said metallic member until radiation therefrom causes a portion of said neck member adjacent said lower end to reach a plastic state; bringing said neck member and said metallic member into contact with each other; removing said local heating before the outer surface of said neck member reaches a running state; and locally heating the edge on said glass plate to sealing temperature.

3. The method of uniting a tubular glass neck member to the small end of a conical metallic member and a glass plate to the large end of said conical member comprising: rotatably mounting said conical member with its axis in a vertical position and its small end extending downwardly; placing said glass plate on said large end; mounting said neck member coaxial with said conical member for rotation in unison therewith but spaced below said small end; locally heating said small end until radiation therefrom causes the portion of said neck member adjacent said small end to reach a plastic state; raising said neck until said adjacent portion contacts with said small end of said conical member; removing said local heating before the outer surface of said portion of said neck member reaches a running state; and locally heating the edge of said glass plate to sealing temperature.

4. The method of uniting a tubular glass neck member to the small end of a conical metallic member and a glass plate to the large end of said conical member comprising: rotatably mounting said conical member with its axis in a vertical position and its small end extending downwardly; placing said glass plate on said large end; mounting said neck member coaxial with said conical member for rotation in unison therewith but spaced below said small end; locally heating said small end until radiation therefrom causes the portion of said neck member adjacent said small end to reach a plastic state; raising said neck until said adjacent portion contacts with said small end of said conical member; removing said local heating before the outer surface of said portion of said neck member reaches a running state; gradually heating the top surface of said glass plate; and locally heating the edge of said glass plate to sealing temperature.

5. The method of uniting a tubular glass neck member to the small end of a conical metallic member and a glass plate to the large end of said conical member comprising: rotatably mounting said conical member with its axis in a vertical position and its small end extending downwardly; placing said glass plate on said large end; mounting said neck member coaxial with said conical member for rotation in unison therewith but spaced below said small end; locally heating said small end until radiation therefrom causes the portion of said neck member adjacent said small end to reach a plastic state; raising said neck until said adjacent portion contacts with said small end of said conical member; removing said local heating before the outer surface of said portion of said neck member reaches a running state; and locally heating the edge of said glass plate to sealing temperature, and introducing air pressure into said conical member to prevent the edge of said glass plate from sagging into said cone.

6. The method of uniting a tubular glass neck member having a flared section to the small end of a conical metallic member having a peripheral flange about its large end and for uniting a glass plate to said large end, comprising: rotatably mounting said conical member with its axis in a vertical position and its small end extending downwardly; placing said glass plate in said flange; mounting said neck member with said flared section extending upwardly coaxially with said conical member for rotation in unison therewith but spaced substantially $\frac{5}{16}''$ below said small end; gradually heating said flared section; gradually heating the top surface of said glass plate; locally heating said small end until radiation therefrom causes the portion of said flared section adjacent said small end to reach a plastic state; raising said neck until said adjacent portion of said flared section contacts with said small end of said conical member; removing said local heating before the outer surface of said portion of said flared section reaches a running state; locally heating said flange portion until the edge of said glass plate settles therein; and introducing air pressure into said conical member to prevent the edge of said glass plate from sagging into said conical member.

ALBERT L. BUTTINO.
HOWARD R. PATTERSON.

References Cited in the file of this patent

UNITED STATES PATENTS

| Number | Name | Date |
|---|---|---|
| 2,271,658 | Miller | Feb. 3, 1942 |
| 2,296,307 | Power | Sept. 22, 1942 |
| 2,386,820 | Spencer | Oct. 16, 1945 |
| 2,482,494 | Knochel et al. | Sept. 20, 1949 |

FOREIGN PATENTS

| Number | Country | Date |
|---|---|---|
| 574,091 | Great Britain | Dec. 20, 1945 |